Figure 1:
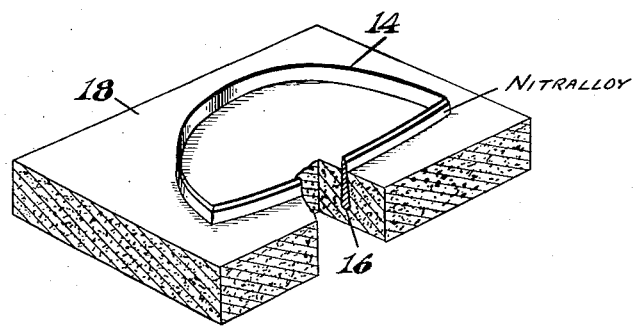

Dec. 29, 1931.  T. H. FROST  1,839,023
CUTTING TOOL
Filed April 20, 1931

INVENTOR
Thomas H. Frost.
by H.W.Kenway. Atty.

Patented Dec. 29, 1931

1,839,023

UNITED STATES PATENT OFFICE

THOMAS H. FROST, OF CAMBRIDGE, MASSACHUSETTS

CUTTING TOOL

Application filed April 20, 1931. Serial No. 531,310.

This invention relates to cutting tools or implements of all descriptions, and particularly to those having blades of more or less rigid character.

In a broad aspect my invention consists in a tool having a blade of ferrous nitridable alloy nitrided in areas adjacent to and including its cutting edge. I have discovered that blades thus characterized possess edge-holding qualities which give them great value as cutting instrumentalities both from the standpoint of keen cutting and in respect to the life of the blade. By my invention moreover I am able to produce successfully exceedingly hard and sharp cutting edges of nitralloy or other ferrous alloy which are durable in use and not subject to crumbling or breaking down on account of brittleness.

The material I employ in the construction of the novel blade of my invention is an alloy of steel containing a substantial amount of aluminum, usually combined with chromium of molybdenum or tungsten and which may be hardened by a process of nitriding, that is to say, by introducing nitrogen into, or causing it to combine with the alloy. One suitable alloy of this type is known under the name "nitralloy" by which it is commonly designated. When this metal is exposed to ammonia fumes under conditions of high temperature it becomes nitrided upon its surface and to a slight distance below its surface and is thereby rendered extremely hard and brittle. Attempts to use this material in the manufacture of blades heretofore have been unsuccessful partly on account of the fact that a contraction or expansion takes place in the nitriding operations which warps or distorts the blank to an extent rendering sharpening difficult or impossible. In accordance with an important feature of my invention I confine the nitriding of the blank to areas adjacent to and including the cutting edges of the blade. This permits expansion of the portions of the blade including the cutting edges by internal adjustment of the blank in its unnitrided areas with the result that the critical portions of the blade are preserved substantially without distortion.

In producing a blade of the novel characteristics herein disclosed I prepare first a blank shaped and at least partially finished in close conformity to the shape eventually desired. I then protect those portions of the blank which are not to be nitrided and these portions may be of such size and so located in the blank as best to support the nitrided and sharpened cutting portions thereof; for example, in such a device as a clicking die I may protect the major portion of the die outside its cutting edge. The blank may be protected in any desired manner as by painting it with a paste of metallic oxide, by partially embedding the blank in plastic protective material or by stacking the blanks with or without spacing members so that their body portions are covered and maintained out of reach of the nitriding agent. Having thus prepared the blanks the nitriding operation is carried out by subjecting the blank to the proper degree of heat in the presence of a suitable nitriding agent, whereupon the unprotected portions of the blank are converted into an extremely hard material while the protected portions remain unnitrided and relatively soft in character. Preferably the blank is completed by finish grinding and this operation may be effected without tendency to form a feather since the hardened material removed in grinding comes off smoothly and leaves the blade in excellent condition for honing or stropping.

These and other features of my invention will be best understood and appreciated from the following description of a preferred embodiment thereof selected for purposes of illustration and shown in the accompanying drawings, in which, Fig. 1 is a view in perspective showing a clicking die prepared for the nitriding process, certain portions being broken away.

Figure 2:
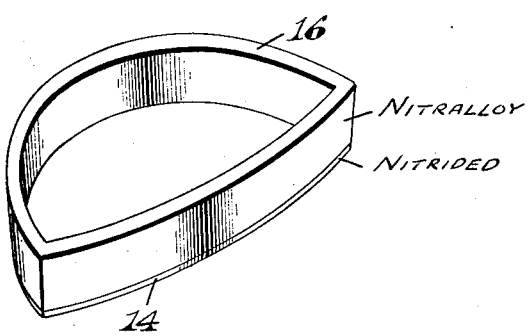

Fig. 2 is a view in perspective of the clicking die in its finished state.

The material employed in producing blades of cutting tools in accordance with my invention may be any nitridable ferrous alloy having the characteristics best suited for the particular type of edged tool required. Nitralloy of either of the following analyses has been found satisfactory for the manufacture of such blades:—

| Element | Analysis A | Analysis B |
|---|---|---|
| Carbon | 0.36 | 0.23 |
| Manganese | .51 | .51 |
| Silicon | .27 | .20 |
| Aluminum | 1.23 | 1.24 |
| Chromium | 1.49 | 1.58 |
| Sulphur | .010 | .011 |
| Phosphorus | .013 | .011 |
| Molybdenum | .18 | .20 |

As one example of a substantially rigid cutting device in which my invention may be embodied I have shown a clicking die such as is used commercially in dieing out parts of boots and shoes. The die shown is designed for cutting toe tips and comprises an open shallow frame of strip or ribbon nitralloy stock sharpened in an acutely tapered bevel at one edge 14 for cutting and flattened on the other edge 16 to receive the pressure of the arm or beam of a clicking machine. The inner wall of the die is substantially vertical in order that the leather blanks cut by it may pass freely through the die, whereas its outer wall is inclined outwardly so that the striking edge of the die is of substantial width. The cutting edge of the die is preferably partially formed prior to the nitriding operation as by rough grinding the strip stock and it is contemplated that the smooth keen edge will be produced by a finished grinding operation after the nitriding step.

In producing a clicking die or a cutting device of similar character I prefer to confine the nitriding operation to a zone adjacent to and including the cutting edge. Accordingly, as shown in the drawings the die may be embedded in Fig. 1 of any plastic protective material such as a paste of stannic oxide and fire clay in water or glycerine. Such protective material 18 is shown as moulded upon and into contact with the walls of the die leaving exposed about one-third of the width of the die including its cutting edge. The flat striking edge 16 of the die and the heavier portion thereof are enclosed by the protective material 18 and substantially protected from the reach of ammonia gas which may be used advantageously as a nitriding agent.

Having prepared the blanks in the manner above explained they may then be heated in a furnace in the presence of ammonia gas at a temperature sufficiently high to insure carrying out the nitriding operation. In some cases a temperature of 930° to 950° F. will be found suitable but I have secured entirely satisfactory results by treating the blanks at a somewhat higher temperature. This results in a deeper penetration of the nitriding effect and a somewhat softer material than that produced at lower temperatures. The nitriding operation may be satisfactorily carried out at a temperature of 950° in an interval of two hours or somewhat less, while at a temperature of about 1150° F. the operation may be completed at an interval as short as five minutes.

The temperature and time used for the nitriding operation may be considered as determining the cutting characteristics of the finished blade. For example, a blade nitrided for two hours at 950° F. when finish sharpened in the ordinary manner gives a sharp but fairly rough edge. If the nitriding operation be carried out at 1150° F. for twenty minutes, the penetration into, or addition of nitrogen to the exposed metal at the higher temperature being more rapid and also resulting in a softer finished product, the blade when finish sharpened in the same manner as the first blade shows a sharp but smooth edge. Some users prefer smooth edged blades and some prefer rough edged blades and these different types of edges may be procured in accordance with my invention by variation of the nitriding temperature to suit the conditions desired.

The length of time of nitriding at any given temperature determines the depth of the nitrided case. This case must be deep enough to allow for any material which may be taken off during finish sharpening operation. The two specified temperatures and times have been found to be satisfactory. It is evident of course that a compromise between a smooth and a rough edge may be obtained by nitriding at a temperature between 1150° F. and 950° F. and for a time long enough to secure the necessary depth of case. Temperatures higher and lower than those above specified may be used with a corresponding decrease or increase in the time necessary for satisfactory nitriding.

At the conclusion of the nitriding operation the clicking die is removed from the protecting material 18 in which it is embedded and completed by a finish sharpening operation which brings the edge 14 to a keen cutting condition. The die thus produced is shown in Fig. 2 of the drawings in the position in which it is normally employed, that is to say, with its flat surface 16 uppermost. By the nitriding step of the process the die has been provided with an extremely hard nitrided case throughout the endless zone which includes its cutting edge 14. This may completely penetrate the die or it may enclose a soft and unnitrided core depending somewhat upon the length of the nitriding period. Under all conditions, however, the hardened case is of sufficient depth to permit the removal of such material as may be necessary to form a keen cutting edge. While the hardened and nitrided edge of the die is necessarily somewhat brittle it is so uniformly distributed and so perfectly supported by the softer and more ductile and more bulky portions of the die that it will withstand all the repeated shocks of the severe usage to which it is subjected without cracking or breaking.

I have disclosed and broadly claimed herein a substantially rigid tool having a blade of nitridable alloy nitrided in an area adjacent to and including its cutting edge. In my earlier Patent No. 1,827,870 I have disclosed my invention as embodied in a safety razor blade and have claimed in it its application to fine edged blades not necessarily of rigid construction.

Having thus disclosed my invention what I desired to secure by Letters Patent of the United States is:—

1. A substantially rigid cutting device comprising a body of nitridable ferrous alloy having a portion or relatively small cross sectional area sharpened in an acute bevel for cutting and nitrided, said nitrided portion merging throughout its length into a supporting portion of relatively larger cross sectional area which is substantially unnitrided and so supplies a tough, ductile backing adapting the nitrided cutting edge to withstand repeated shocks in use.

2. A clicking die comprising a frame of strip steel alloy of nitridable character, said frame being sharpened at one edge in an acute bevel for cutting and being nitrided in a continuous peripheral zone including said edge, and having a supporting portion of greater bulk which is co-extensive with said nitrided zone and is substantially unnitrided, thereby furnishing a more ductile backing adapting the die to withstand repeated shocks in use.

3. A clicking die comprising a frame of strip steel alloy of nitridable character, said frame being sharpened at one edge in an acute bevel for cutting and being nitrided in a continuous peripheral zone including said edge, and diverging from said edge into a thicker supporting portion which is co-extensive therewith and has a flat striking surface, said supporting portion being substantially unnitrided in a zone including its striking surface, thereby adapting the die to withstand repeated shocks in use.

THOMAS H. FROST.